(12) United States Patent
Bhattacharya

(10) Patent No.: US 9,454,468 B2
(45) Date of Patent: Sep. 27, 2016

(54) METHOD AND SYSTEM FOR TESTING SOFTWARE

(71) Applicant: Wipro Limited, Bangalore (IN)

(72) Inventor: Sourav Sam Bhattacharya, Fountain Hills, AZ (US)

(73) Assignee: Wipro Limited, Bangalore (IN)

( * ) Notice: Subject to any disclaimer, the term of this patent is extended or adjusted under 35 U.S.C. 154(b) by 225 days.

(21) Appl. No.: 14/316,996

(22) Filed: Jun. 27, 2014

(65) Prior Publication Data

US 2015/0378877 A1  Dec. 31, 2015

(51) Int. Cl.
  *G06F 11/00* (2006.01)
  *G06F 11/36* (2006.01)

(52) U.S. Cl.
  CPC ....... *G06F 11/3688* (2013.01); *G06F 11/3632* (2013.01)

(58) Field of Classification Search
  CPC .................................................. G06F 11/3688
  See application file for complete search history.

(56) References Cited

U.S. PATENT DOCUMENTS

| | | | |
|---|---|---|---|
| 5,056,094 A * | 10/1991 | Whetsel | G01R 31/318541 714/724 |
| 6,980,040 B2 * | 12/2005 | Jang | G01R 31/3016 327/153 |
| 7,461,310 B2 * | 12/2008 | Wang | G01R 31/31858 714/727 |
| 7,583,948 B2 * | 9/2009 | Watanabe | H03H 11/1291 331/108 B |
| 7,590,902 B1 * | 9/2009 | Tabatabaei | G01R 31/318572 714/724 |
| 7,679,333 B2 * | 3/2010 | Goto | H02J 7/0031 320/134 |
| 8,542,003 B2 * | 9/2013 | Uetmatsu | G01R 31/31725 324/76.11 |
| 8,589,843 B2 * | 11/2013 | Lackey | G01R 31/318307 716/111 |
| 2007/0288818 A1 * | 12/2007 | Wang | G01R 31/31858 714/726 |
| 2013/0125076 A1 * | 5/2013 | Bickford | G01R 31/31725 716/113 |
| 2014/0047404 A1 * | 2/2014 | Lin | G01R 31/318357 716/113 |

OTHER PUBLICATIONS

Blom, Stefan, et al., "Simulated Time for Testing Railway Interlockings with TTCN-3*", Formal Approaches to Testing of Software, 5th International Workshop, FATES 2005, Edinburgh, UK, Aug. 11, 2005, (Lecture Notes in Computer Science, 3997, pp. 1-15) (2006).

* cited by examiner

*Primary Examiner* — Christopher McCarthy
(74) *Attorney, Agent, or Firm* — LeClairRyan, a Professional Corporation

(57) ABSTRACT

In one embodiment, a method of testing a software is disclosed. The method comprises: providing an input event to the software under test, wherein the software under test is associated with a time delay between an input event and an output event; identifying one or more discrete time instances based on the time delay between the input event and the output event; and testing the software under test by synthetically setting a clock to the one or more discrete time instances.

15 Claims, 4 Drawing Sheets

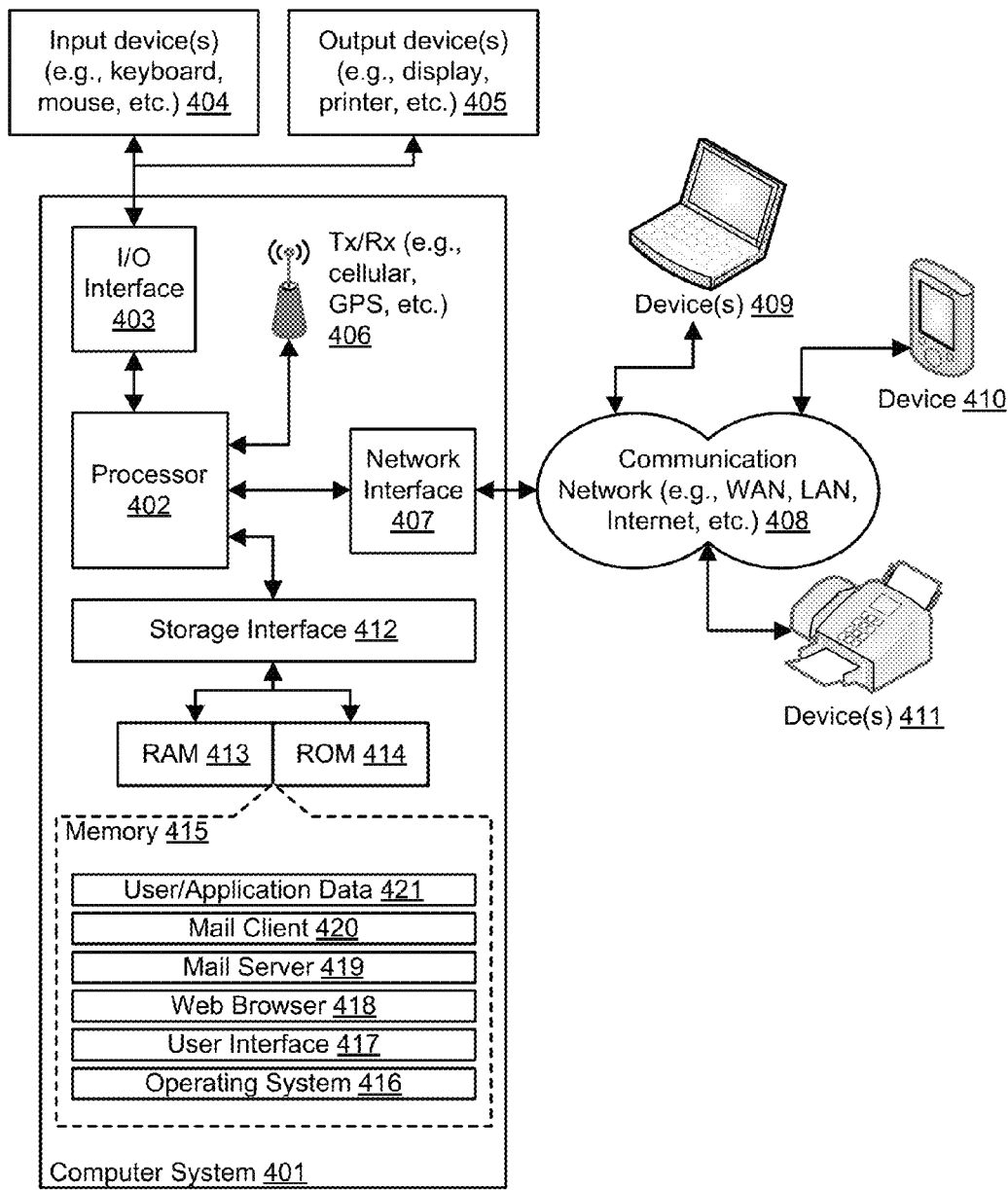
FIG. 4: Example Computer System

US 9,454,468 B2

1

METHOD AND SYSTEM FOR TESTING SOFTWARE

FIELD

This disclosure relates generally to software testing, and more particularly to a method and system for time scaled testing.

BACKGROUND

In some cases of software testing, functional requirements may include testing one or more event-pairs having a large time delay between a triggering event and a triggered event. An example of this could be a situation where a contractor, once on-boarded, is to be automatically terminated at the end of 60 days unless extended by a manager. Here, the hiring of the contractor may be considered the triggering event and the auto-termination, the triggered event. In order to test this code functionality, a straight line temporal software testing mechanism may be used wherein the test time units are mapped 1:1 to the wall clock time. In other words, if there is a Delay of 60 days between two events which are to be tested, the test project shall span 60 days.

To reduce the time taken to test delay based software, a time scale factor may be used. For example, a time scale factor of 1 day=1 minute may be employed to test the code. To implement this, a development team may change the code to manifest the delay into an updated condition. For example, to test a 60 day delay, the development team may make adjustments to the code to test for a 60 minute threshold, since 1 day is scaled to 1 minute. Post successful completion of the test, the development team may need to change the code back to the original code without the scaled time effect. For example, the delay is set back to 60 days instead of 60 minutes.

In this approach, once the testing is over, the additional code that was introduced for scaling the time factor is removed. This may not be ideal as such modifications may affect the reliability/functionality of the original code. Since developers are changing and re-changing the code base, a regression test re-run may need to be performed after each change. Consequently, a regression test may be required post functional testing. A regression test may be expensive, both in terms of time and resource.

SUMMARY

In one embodiment, a method of testing a software is disclosed. The method comprises: providing an input event to the software under test, wherein the software under test is associated with a time delay between an input event and an output event; identifying one or more discrete time instances based on the time delay between the input event and the output event; and testing the software under test by syn- thetically setting a clock to the one or more discrete time instances, wherein synthetically setting the clock to the one or more discrete time instances comprises providing prede- termined inputs sequentially at the one or more discrete time instances.

In another embodiment, an apparatus for testing a soft- ware is disclosed. The apparatus comprises a processor; and a memory disposed in communication with the processor and storing processor-executable instructions. The instruc- tions comprise instructions to: provide an input event to the software under test, wherein the software under test is associated with a time delay between an input event and an output event; identify one or more discrete time instances based on the time delay between the input event and the output event; and test the software under test by syntheti- cally setting a clock associated with the processor to the one or more discrete time instances, wherein synthetically set- ting the clock to the one or more discrete time instances comprises providing predetermined inputs sequentially at the one or more discrete time instances.

In yet another embodiment, a non-transitory computer- readable storage medium storing instructions which when executed by a processor enable the processor to test a software is disclosed. The instructions comprise instructions to: provide an input event to the software under test, wherein the software under test is associated with a time delay between an input event and an output event; identify one or more discrete time instances based on the time delay between the input event and the output event; and test the software under test by synthetically setting a clock to the one or more discrete time instances, wherein synthetically set- ting the clock to the one or more discrete time instances comprises providing predetermined inputs sequentially at the one or more discrete time instances.

It is to be understood that both the foregoing general description and the following detailed description are exem- plary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a block diagram of an exemplary computer system for implementing embodiments consistent with the present disclosure.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodi- ments. It is intended that the following detailed description be considered as exemplary only, with the true scope and spirit being indicated by the following claims.

Figure 1:
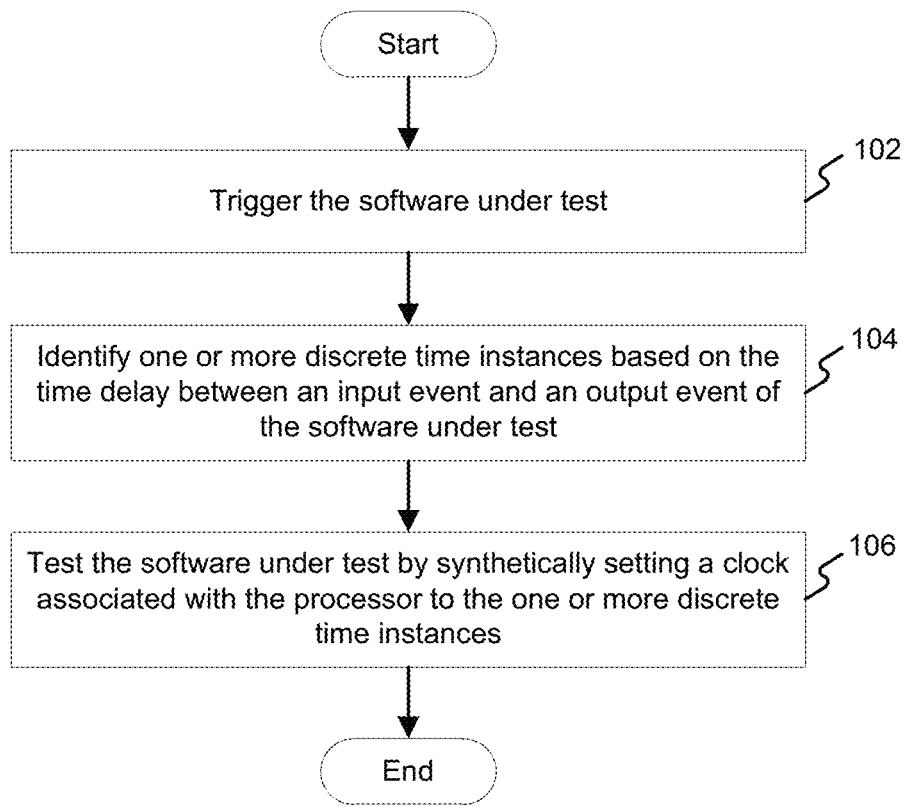
FIG. 1 illustrates a flow diagram of a method of testing a software according to some embodiments of the present disclosure.

FIG. 1 illustrates a flow chart of a method of testing a software. The method comprises providing an input event to a software under test at step 102. In other words, a test case may be applied to the software under test. The software under test may include a delay between an input event to the software and an output event from the software. The "delay" corresponds to a time period between a triggering event and a triggered event. For example, an application that manages hiring operations in an organization may require a reminder to be sent to an employee in case the employee fails to submit relevant documents within a three month period from the date of joining Here, the triggering event is the employee joining the organization. Sending of the reminder to the employee is the triggered event and the "delay" is three months. Since the delay is programmatically included in the code, the delay is known beforehand.

In some embodiments, the software under test may include a number of events between the input event and the output event. In other words, a 2-pair event chain could be extended to an N-pair chain where a first event triggers a second event after a delay d12, the second event triggers a third event after a delay d23 and so on. For example, an N-pair event chain may be represented as:

[e1, e2, d12]; [e2, e3, d23]; [e3, e4, d34]; [e4, e5, d45]; . . . [e(N−1), e(N), d(N−1)(N)]

In some other embodiments, the triggering event may comprise several independent triggering sub-events conjoined over an AND-OR relationship rather than a single triggering event. In some other embodiments, the triggered event may comprise a number of sub-events conjoined over an AND-OR relationship.

At step 104, one or more discrete time instances may be identified based on the time delay between the input event and the output event. In cases where there are multiple triggering events or multiple triggered events, the delay between each pair of events may be considered to identify the discrete time instances. An event-pair test table may be created and depending upon whether it is a 2-pair or an N-pair event chain, a list of discrete time instances may be determined representing the initial, the final and the set of intermediate discrete time instances. The discrete time instances may be determined based on a function of the time delay between event pairs. For example, if the delay between an input event and an output event is 15 minutes, then the discrete time instances may be identified as multiples of the delay. The discrete time instances may be (0, 15, 30, 45, 60, 75, . . . ) minutes. Similarly, if two event pairs are to be tested having a delay of 11 days for the first event pair and 7 days for the second event pair, then the discrete time instances may be identified as a union of the multiples of the two delays. Thus, the time instances may be determined as: (0, 7, 11, 14, 21, 22, 28, 33, 35, 42, 44, 49, 55, 56, 63, 66, 70, 77, . . . ) days. The number of discrete time instances to be considered may be predefined by a test engineer.

Once the discrete time instances are identified, the software under test may be tested by synthetically setting a system clock to the one or more identified discrete time instances. Synthetically setting the system clock to the identified time instances may include issuing clock reset instructions to reset the clock to the discrete time instances by a master clock. In other words, the clock may be skipped (not scaled) from one time instance to the next by progressing the clock independent from the wall clock time. On resetting the clock to a discrete time instance, the test scenario at that time instance may be mimicked. In order to mimic the test scenario at a particular time instance, predetermined inputs corresponding to each discrete time instance may be provided sequentially to the software under test. A test input stub table may be maintained having a list of (testable time instant, input) pairs. Each entry in the table may include a discrete time instant and an input to be provided for that time instant. The input for a particular discrete time instant may be predetermined based on domain knowledge and historical information. The input for a particular discrete time instant may signify the expected input at that time instant. The domain knowledge involves identifying all the relevant input and output points for the software under test. For example, in a financial accounting software the list of inputs may include the numbers that the software under test requires to operate. Likewise, in an Identity Management software, the list of inputs may include feeds from Peoplesoft™, Active Directory™, LDAP, auxiliary systems like Payroll or Badging Systems, intranet servers such as the Unix or Windows servers and so on. The domain knowledge is used to identify a comprehensive set of input points and a valid set of input values for each such identified input point. The domain knowledge may be captured from a human domain expert, upon analyzing system architecture documents, inspection and interview of domain experts. The domain knowledge may also be captured from a log of the test history, wherein the same software under test may have executed in the past and the set of inputs imparted onto the software under test was archived.

On providing an input at a discrete time instant, the subsequent event or the output event as the case may be, may be validated by comparing the output to an expected output. The expected output may be predetermined based on domain knowledge and historical data. The actual output may be compared with the expected output to validate the event. If the subsequent event or the output event is not validated, then the test case is considered to have failed. For example, considering an N-pair event: {[e1, e2, d12]; [e2, e3, d23]; [e3, e4, d34]; [e4, e5, d45]; [e(N−1), e(N), d(N−1)(N)]} Test shall be executed as Trigger Event e1,
  i. Reset the clock to advance by d12 units of time;
  ii. Provide Test Stub Input for time advancement by d12
Validate output event e2. If not validated, test case fail, else
  i. Reset the clock to advance by d23 units of time
  ii. Provide Test Stub Input for time advancement by d23
Validate output event e3. If not validated, test case fail, else
  i. Reset the clock to advance by d34 units of time
  ii. Provide Test Stub Input for time advancement by d34
. . .
Validate output event e[N−1]. If not validated, test case fail, else
  i. Reset the clock to advance by d[N−1]N units of time
  ii. Provide Test Stub Input for time advancement by d[N−1]N
Validate output event e[N]. If not validated, test case fail, else passed.

In some embodiments, the triggering event may not be a single event but rather N independent triggering events conjoined over an AND-OR relationship. Here, the event e1 may be made up of a number of sub-events. The other events may be chained, as intermediate events. The final event is e(N). The test case is considered to have passed if the entire chain is traversed successfully. This generalization is described as follows:

$$\{e1 = [e(s,1), e(s,2), \ldots, e(s,N)]$$

[e1, e2, d12]; [e2, e3, d23]; [e3, e4, d34]; [e4, e5, d45]
. . .
[e(N−1), e(N), d(N−1)(N)]
Test shall be executed as
  Trigger Event e1, which is not a single event but an AND/OR logical relationship over events stream [e(s,1), e(s,2), e(s,3), . . . , e(s,N)]

Reset the clock to advance by d12 units of time;
Provide Test Stub Input for time advancement by d12
Validate output event e2. If not validated, test case fail
Reset the clock to advance by d23 units of time
Provide Test Stub Input for time advancement by d23
Validate output event e3. If not validated, test case fail
Reset the clock to advance by d34 units of time
Provide Test Stub Input for time advancement by d34
. . .
Validate output event e[N−1]. If not validated, test case fail
Reset the clock to advance by d[N−1]N units of time
Provide Test Stub Input for time advancement by d[N−1]N
Validate output event e[N]. If not validated, Test case fail, else test case pass.

Thus, the total execution time for running a test case is proportional to the number of discrete test time units and is unrelated to the total delay between events.

Figure 2:
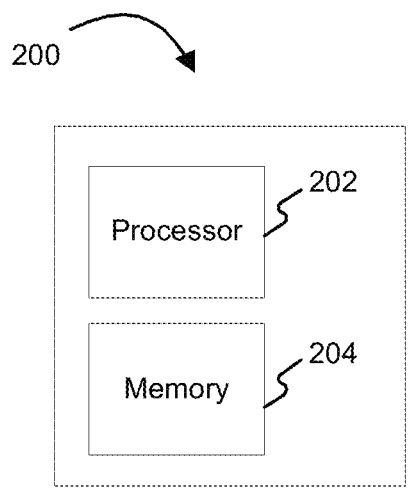
FIG. 2 illustrates an apparatus for testing a software according to some embodiments of the present disclosure.

An apparatus 200 for testing a software will now be described in conjunction with FIG. 2. Apparatus 200 may include a processor 202 and a memory 204 disposed in communication with processor 202 and storing processor-executable instructions. The instructions may include instructions to provide an input event to the software under test, wherein the software under test is associated with a time delay between the input event and an output event. In some embodiments, the input event may include one or more sub-events conjoined over a Boolean expression. For example, the sub-events may be conjoined over an AND-OR relationship. In some embodiments, the input event and the output event may be separated by a chain of intermediate events. In some embodiments, the output event may include one or more sub-events conjoined over a Boolean expression. Thus, the software under test may include one or more source events, one or more intermediate events and one or more final events as explained in conjunction with FIG. 1.

Memory 204 may further include instructions to identify one or more discrete time instances based on the time delays between event-pairs. The method of identifying the one or more discrete time instances is explained in detail in conjunction with FIG. 1. On determining the one or more discrete time instances, processor 202 may test the software by mimicking the test scenario at the one or more discrete time instances. A master clock associated with apparatus 200 may synthetically set a system clock to the one or more identified time instances by issuing clock reset instructions to reset the clock sequentially to the discrete time instances. Thus, the system clock may progress independent from the wall clock time.

To test the software, processor 202 may provide predetermined inputs at the various discrete time instances. A test input stub table may be maintained having a list of (testable time instant, input) pairs. Each entry in the table may include a discrete time instant and an input to be provided for that time instant. The input for a particular discrete time instant may be predetermined based on domain knowledge and historical information. The input for a particular discrete time instant may signify the expected input at that time instant if the test case was run without any time scaling.

On providing an input at a discrete time instant, processor 202 may validate the subsequent event or the output event as the case may be, by comparing the actual output to an expected output. The expected output may be predetermined based on domain knowledge and historical data. The actual output may be compared with the expected output to validate the event. If the subsequent event or the output event is not validated, then the test case is considered to have failed, else passed.

Figure 3:
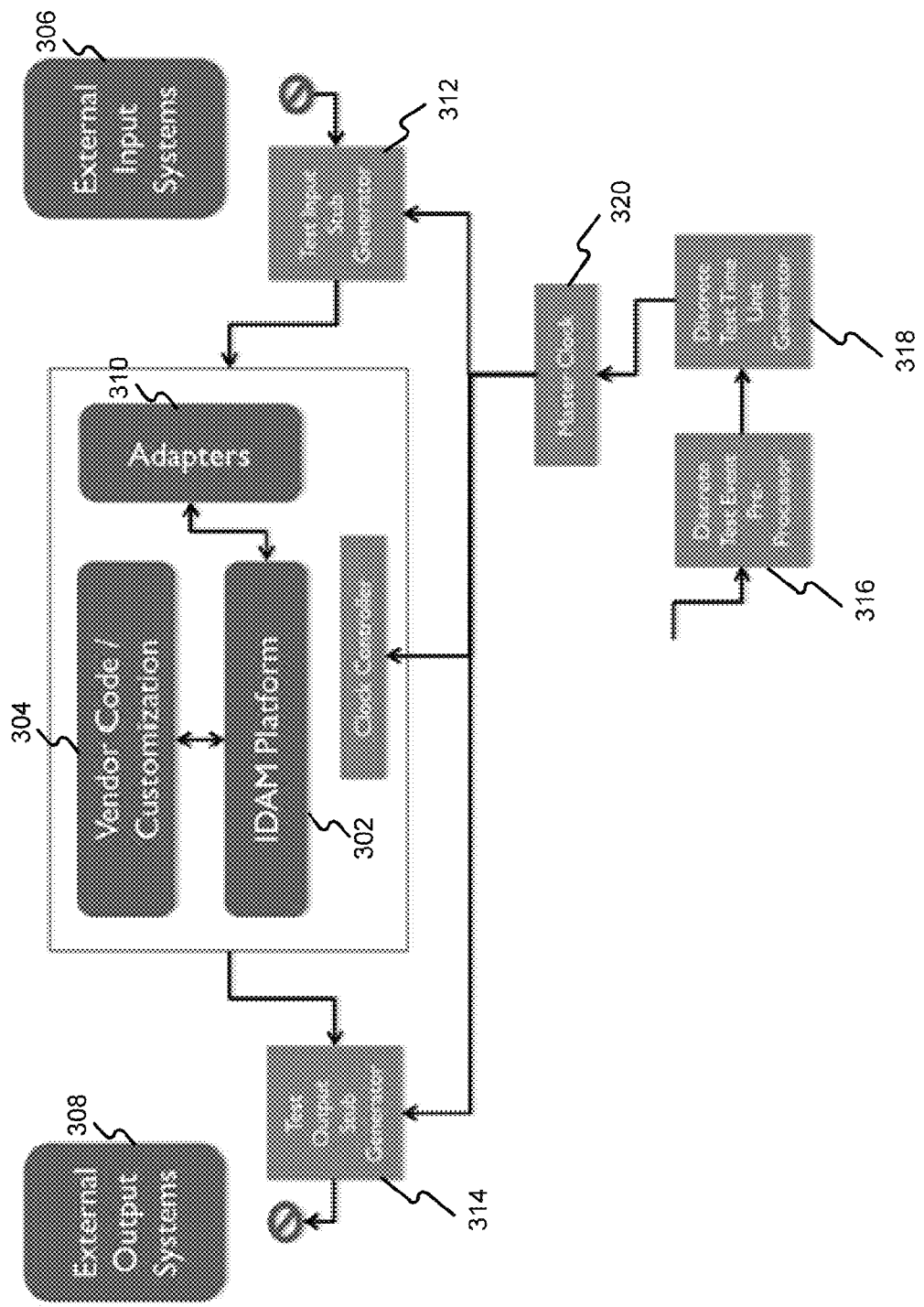
FIG. 3 illustrates an exemplary block diagram of a system for testing Identity and Access Management (IDAM) appli- cation in accordance with some embodiments of the disclo- sure.

FIG. 3 illustrates an exemplary block diagram of a system 300 to test an Identity and Access Management (IDAM) application in accordance with some embodiments of the disclosure. Typically, an IDAM system is seldom built from ground-up; instead an existing IDAM baseline system may be procured upon which application specific customization may be done. IDAM Platform 302 may form the baseline industry solution with vendor code/customization 304 on top of it. Most typically, the client application may involve a large number of Human Resources (HR), business and business logic related applications which may not come with a pre-canned IDAM procurement from industry available products. The said customizations may be done through the vendor developed code. Vendor code customization may be done by a third party, by writing scripts and other custom development to meet a client's needs.

System 300 may further include external input systems 306 and external output systems 308. These may include client specific identity and access admin and audit systems. The external input systems 306 may feed inputs to the IDAM application for testing purposes. Some examples of external inputs systems 306 may include Peoplesoft™ (a HR management system), Active Directory™ (a directory service), Badging Systems, Payroll, etc. The external input and output systems may be interfaced with the IDAM platform through one or more adapters such as adapter 310.

However, the connections between live input feeds from the external input systems 306 and live output feeds from the external output systems 308 are severed during software testing in accordance with the embodiments of the present disclosure. Instead, a test input stub generator 312 and a test output stub generator 314 may be connected to replace the external input systems 306 and the external output stub generator 308 respectively. The test input stub generator 312 may provide predetermined inputs to test the IDAM application at discrete time instances. The test input stub generator 312 may be a table in simple systems. In complex systems, generator 312 may be a stub code that produces the intended values identical to what a table would have stored. Test input stub generator 312 may maintain a list of all input systems that provide input values to the IDAM system as a whole. The input values may be provided to the IDAM Platform, or to the Adapters or to the Vendor Customization code.

Similarly, test output stub generator 314 may include a list of all output feeds. For each testable time instant, an output value may be pre-computed for each output feed. The output values may be stored in a table (in a simple implementation) or in a stub code which would produce identical values as to the tabular storage.

The predetermined inputs and outputs may be used to test the IDAM application. The predetermined inputs may be provided to the IDAM application at discrete time instances. The discrete time instances may be determined by a Discrete Test Event Pre-Processor 316. Discrete Test Event Pre-Processor 316 may receive a list of event-pair test entries and output a list of discrete time instances at which test is executed. Identifying the one or more discrete time instances is explained in detail in conjunction with FIG. 1. System 300 may further include a Discrete Test-Time Unit Generator 318 to receive as an input, the list of discrete temporal events from Discrete Test Event Pre-Processor 316. Discrete Test Event Pre-Processor 316 may produce a timestamp series and eventually provide a list of testable time instants. The timestamp series may be a list of linearly ordered and monotonically increasing time instant values. Each time instant value may be an integral multiplier of the time delay between the input event and output event. For example, if the software under test has one (input, output) pair delay=7, then the timestamp series will be even multiples of 7—as, 7, 14, 21, 28, and so on. However, when multiple timestamp series are in effect, due to multiple (input, output) event pairs, the aggregate timestamp series may be a logical union of superimposition of the multiple timestamp series. Considering two such pairs, one with (input, output) delay=7, and the other with (input, output) delay=3, the timestamp series for the first will be [7, 14, 21, 28, 35, . . . ], while the timestamp series for the second will be [3, 6, 9, 12, 15, 18, 21, 24, 27, 30, 33, . . . ]. The aggregate timestamp series will be a logical union of superimposition of these two timestamp series, resulting in [3, 6, 7, 9, 12, 14, 15, 18, 21, 24, 27, 28, 30, 33, 35, 36, . . . ]

Further, Discrete Test Time Unit Generator 318 may skip the clock from one test time data point to the next test time data point. Upon receipt of the timestamp series, a master clock 320 may issue clock reset instructions to a clock controller 322. Clock controller 322 may in turn issue time reset commands to all the servers representing the IDAM platform as well as the servers that host the vendor customization code.

In one example, Test Input Stub Generator 312, Test Output Stub Generator 314, Discrete Test Event Pre-Processor 316, Discrete Test Time Unit Generator 318 may amongst other things, include routines, programs, objects, components, and data structures, which perform particular tasks or implement particular abstract data types. Test Input Stub Generator 312, Test Output Stub Generator 314, Discrete Test Event Pre-Processor 316, Discrete Test Time Unit Generator 318 may also be implemented as, signal processor(s), state machine(s), logic circuitries, and/or any other device or component that manipulate signals based on operational instructions. Further, Test Input Stub Generator 312, Test Output Stub Generator 314, Discrete Test Event Pre-Processor 316, Discrete Test Time Unit Generator 318 can be implemented by one or more hardware components, by computer-readable instructions executed by a processing unit, or by a combination thereof.

The current disclosure focuses on functional requirements, by correlating a causality relationship amongst "input" and "output". However, the underlying idea of the current invention can be extended to non-functional requirements as well, e.g., for security requirements or performance requirements. Example performance requirement may include a repeated/stream of (input, output) pairs which incur a constant delay or lag. Example security requirement may include a penetration attempt at a firewall port and the delay incurred to capture the effect of the said penetration at an Intrusion Detection System (IDS) in the intranet. Most non-functional requirements (NFR) can be captured as one or a set of timestamp set of events, and hence the applicability of the current disclosure to NFRs as well, beyond the functional requirements.

The current disclosure assumes a deterministic numeric delay value between (input, output) pair, however, the underlying idea of the current disclosure may be extended to range based delay between (input, output) also. An example of a range based delay may be (input, output) delay=[7,2], which means the delay between "input" to "output" is a value between (7−2)=5 to (7+2)=9, with an average=7. In this case and such, the timestamp series may be produced anchoring at an interval delay any value between 5 to 9, and scope of optimization exists to enjoin multiple timestamp series. Consider two (input, output) event pairs, the first pair having a delay [4,1] and the second pair having a delay [7,2]. Thus, the first pair can have any delay between 3 and 5, whereas the second pair can have any delay between 5 and 9. In this example, choosing both events to have a delay=5 will compact the timestamp series, because the value 5 meets both delay range criteria, and serves as a common denominator to the overall timestamp series.

The current disclosure assumes a 100% certainty between the input (cause) and output (effect) in the software under test. Once the input event is triggered it is 100% certain that after the indicated time delay the output event will occur. This model can be generalized to probabilistic events as well. The underlying idea of the current invention can be extended to probabilistic (instead of deterministic) model, where each (input, output) pair associates itself with a (delay, probability). For example, events e1 and e2 may have a (delay, probability) value=(7, 50%), indicating that the trigger of e1 will 50% likely trigger event e2 after a time gap of 7 units of time. Generation of the timestamp series in such a case must accommodate the probability value, for example with (7, 50%), the timestamp series will include integral multiples of 7 with a "1 in 2" (resulting out of 50%) skip factor, resulting in a series [7, 21, 35, 49, . . . ]. The intermediate values 14, 28, 42, . . . may be skipped.

Computer System

FIG. 4 is a block diagram of an exemplary computer system for implementing embodiments consistent with the present disclosure. Variations of computer system 401 may be used for implementing apparatus 200. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 47 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft.NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described a method and system for testing a software. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of testing a software, the method comprising:
   providing, by a software management computing device, an input event to the software, wherein the software is associated with a time delay between the input event and an output event;
   identifying, by the software management computing device, one or more discrete time instances based on the time delay between the input event and the output event; and
   testing, by the software management computing device, the software by synthetically setting a clock to the one or more discrete time instances, wherein synthetically setting the clock to the one or more discrete time instances comprises providing predetermined inputs sequentially at the one or more discrete time instances and wherein synthetically setting the clock comprises progressing the clock independent from a wall clock time.

2. The method of claim 1, wherein the input event comprises a Boolean expression of a plurality of sub-events.

3. The method of claim 1, wherein the output event triggers a second event under test and wherein the second event may be a single event or a Boolean expression of a plurality of second set of sub-events.

4. The method of claim 1, wherein the one or more discrete time instances are identified based on a function of the time delay between the input event and the output event.

5. The method of claim 1, wherein testing the software comprises comparing the output event with a predetermined expected output.

6. An software management computing device comprising:
   a memory; and
   a processor coupled to the memory, the processor configured to execute programmed instructions stored in the memory comprising:
      providing an input event to the software under test, wherein the software under test is associated with a time delay between the input event and an output event;
      identifying one or more discrete time instances based on the time delay between the input event and the output event; and
      testing the software under test by synthetically setting a clock associated with the processor to the one or more discrete time instances, wherein synthetically setting the clock to the one or more discrete time instances comprises providing predetermined inputs sequentially at the one or more discrete time instances and wherein synthetically setting the clock comprises progressing the clock independent from a wall clock time.

7. The device of claim 6, wherein the input event comprises a Boolean expression of a plurality of sub-events.

8. The device of claim 6, wherein the output event triggers a second event under test, and wherein the second event may be a single event or a Boolean expression of second set of sub-events.

9. The device of claim 6, wherein the one or more discrete time instances are identified based on a function of the time delay between the input event and the output event.

10. The device of claim 6, wherein testing the software under test comprises comparing the output event with a predetermined expected output.

11. A non-transitory computer readable medium having Stored thereon instructions for testing a software comprising machine executable code which, when executed by a processor causes the processor to perform steps comprising:
   providing an input event to the software under test, wherein the software under test is associated with a time delay between the input event and an output event;
   identifying one or more discrete time instances based on the time delay between the input event and the output event; and
   testing the software under test by synthetically setting a clock to the one or more discrete time instances, wherein synthetically setting the clock to the one or more discrete time instances comprises providing predetermined inputs sequentially at the one or more discrete time instances and wherein synthetically setting the clock comprises progressing the clock independent from a wall clock time.

12. The medium of claim 11, wherein the input event comprises a Boolean expression of a plurality of sub-events.

13. The medium of claim 11, wherein the output event triggers a second event under test, and wherein the second event is either a single event or a Boolean expression of second set of sub-events.

14. The medium of claim 11, wherein the one or more discrete time instances are identified based on a function of the time delay between the input event and the output event.

15. The medium of claim 11, wherein testing the software under test comprises comparing the output event with a predetermined expected output.

* * * * *